United States Patent
Itoh et al.

(10) Patent No.: US 6,761,143 B1
(45) Date of Patent: Jul. 13, 2004

(54) COUPLING STRUCTURE FOR EXPANSION UNIT OUTPUT SHAFT AND DRIVEN-SIDE TRANSMISSION SHAFT

(75) Inventors: Naoki Itoh, Wako (JP); Tsuneo Endoh, Wako (JP); Yasunobu Kawakami, Wako (JP); Ryuji Sano, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/111,393
(22) PCT Filed: Nov. 2, 2000
(86) PCT No.: PCT/JP00/07738
§ 371 (c)(1), (2), (4) Date: Sep. 18, 2002
(87) PCT Pub. No.: WO01/33048
PCT Pub. Date: May 10, 2001

(30) Foreign Application Priority Data

Nov. 4, 1999 (JP) .......................... 11-313483

(51) Int. Cl.⁷ .............................. F02B 53/04
(52) U.S. Cl. ..................... 123/227; 60/618; 60/651; 418/264; 418/266; 418/150
(58) Field of Search ............. 415/122.1, 124.1, 415/123; 285/9.5; 464/29; 60/608, 651; 418/264, 266, 150; 123/227, 226, 245

(56) References Cited

U.S. PATENT DOCUMENTS 2,847,186 A   8/1958  Anderson et al.
5,334,004 A * 8/1994  Lefevre et al. ............. 417/420

FOREIGN PATENT DOCUMENTS

| JP | 01073180   | * 3/1989  | .......... F04C/2/344 |
| JP | 1-33768    | 10/1989   | |
| JP | 3-253702   | 11/1991   | |
| JP | 11-82631   | 3/1999    | |

* cited by examiner

Primary Examiner—Edward K. Look
Assistant Examiner—Dwayne J. White
(74) Attorney, Agent, or Firm—Arent Fox PLLC

(57) ABSTRACT

An expansion unit (4) for converting an expansion energy of pressure-increased steam into a rotation energy of an output shaft, wherein a cover member (26) is provided on the casing outer surface of the expansion unit (4). The cover member (26) has a function of sealing the end section of an output shaft (23) protruding beyond the casing outer surface against the outside and a function of recovering steam led out from the casing and has its pressured reduced after the conversion. The end section of the output shaft (23) provided inside the cover member (26) and a driven-side transmission shaft (119) disposed outside the cover member (26) are coupled with each other via a magnet type shaft coupling (120) so as to be able to transmit power, whereby the output shaft (23) and the driven-side transmission shaft (119) can be coupled without steam in the expansion unit leaking outside.

8 Claims, 11 Drawing Sheets

COUPLING STRUCTURE FOR EXPANSION UNIT OUTPUT SHAFT AND DRIVEN-SIDE TRANSMISSION SHAFT

FIELD OF THE INVENTION

The present invention relates to a structure of connection between an output shaft of an expander, particularly, a member in which an expansion energy of a raised pressure vapor serving as an operating medium is converted into a rotating energy for the output shaft, and a transmitting shaft of a driven member.

BACKGROUND ART

Such an expander is conventionally used, for example, as a motor in a Rankin cycle. There is such a conventionally known connection structure in which an end of an output shaft is located to protrude to the outside from a casing of an expander and is connected to the transmitting shaft through a gear device (for example, see Japanese Utility Model Publication No.1-33768).

Of course, a seal member is mounted in an output shaft-insertion bore provided in the casing, but the following problem is encountered: The raised-pressure vapor may be leaked to the outside through between the seal member and the output shaft, and such leakage of the vapor to the outside results in a reduction in amount of the operating medium, thereby detracting the function of the Rankin cycle and failing the maintaining of the performance.

DISCLOSURE OF THE INVENTION

It is an object of the present invention to provide a connection structure of the above-described type, wherein the output shaft of the expander and the transmitting shaft of the driven member can be connected to each other to prevent the leakage of the raised-pressure vapor serving as the operating medium to the outside.

To achieve the above object, according to the present invention, there is provided a structure of connection between an output shaft of an expander and a transmitting shaft of a driven member, comprising a cover member mounted on an outer surface of a casing of an expander in which an energy of expansion of vapor having a raised pressure is converted into a rotating energy for an output shaft, the cover member having a function of sealing an end of the output shaft protruding on the outer surface of the casing against the outside and a function of recovering vapor discharged from the casing and having a dropped pressure after the conversion, and a connecting member for connecting the end of the output shaft located within the cover member and the transmitting shaft of the driven member disposed outside the cover member, so that a power can be transmitted.

With the above arrangement, the output shaft and the transmitting shaft of the driven member can be connected to each other with the periphery of the end of the output shaft being sealed, so that the power can be transmitted. In addition, the raised-pressure vapor leaked from the sealed portion of the output shaft in the casing is recovered by the cover member and hence, cannot be leaked to the outside. Further, the recovered vapor is dropped in pressure within the cover member and fed to the condenser, for example, along with the dropped-pressure vapor discharged from the casing. Thus, it is possible to avoid a reduction in amount of the operating medium to maintain the function of the Rankin cycle and the performance.

BEST MODE FOR CARRYING OUT THE INVENTION

Figure 1:
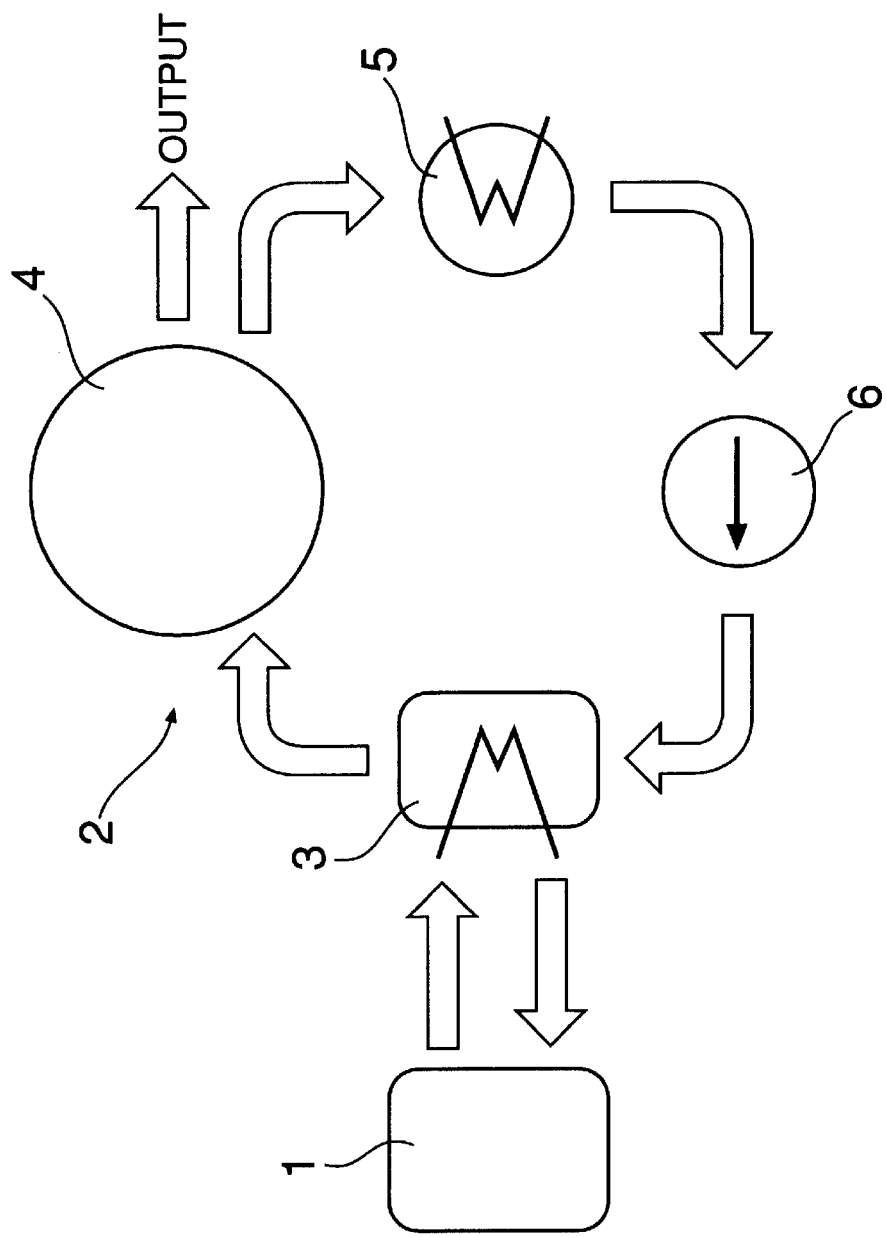
FIG. 1 is a schematic illustration of a waste heat recovering device for an internal combustion engine.

Referring to FIG. 1, a waste heat recovering device 2 for an internal combustion engine 1 utilizing a Rankin cycle includes an evaporator 3 for generating a vapor having a raised temperature and a raised pressure, which is an operating medium, namely, a raised-temperature/pressure vapor, utilizing a waste heat from the internal combustion engine 1, e.g., an exhaust gas as a heat source, an expander 4 in which an energy of expansion of the raised-temperature/pressure vapor is converted into a rotating energy for an output shaft, a condenser 5 for liquefying a vapor having a dropped temperature and a dropped pressure, namely, dropped-temperature/pressure vapor discharged from the expander 4 after the conversion, and a supply pump 6 for supplying a liquid, e.g., water from the condenser 5 to the evaporator 3.

The expander 4 has a special structure and is constructed as described below.

Referring to FIGS. 2 to 6, a casing 7 is comprised of first and second halves 8 and 9 made of a metal. Each of the halves 8 and 9 comprises a main body 11 having a substantially circular recess 10, and a circular flange 12 integral with the main body 11. A substantially elliptic rotor chamber 14 is defined by superposing both the circular flanges 12 one on another with a metal gasket 13 interposed therebetween. An outer surface of the main body 11 of the first half 8 is covered with a deep bowl-shaped main body 16 of a shell-shaped member 15, and an expansion chamber 20 is defined between both of the main bodies 11 and 16 of the shell-shaped member 15 and the first half 8 by superposition of a circular flange 17 integral with the main body 16 on the circular flange 12 of the first half 8 with a gasket interposed therebetween. Further, an outer surface of the man body 11 of the second half 9 is covered with a stepped cylindrical main body 27 of a cover member 26, and a dropped-temperature/pressure vapor recovery chamber 29 is defined by superposition of a circular flange 28 integral with the main body 27 on the circular flange 12 of the second half 9 with a gasket G interposed therebetween. The recovery chamber 29 communicates with the condenser 5 through a duct 30. The four circular flanges 12, 12, 17 and 28 are fastened at a plurality of circumferential points by bolts 19.

The main bodies 11 of the halves 8 and 9 include hollow bearing tubes 21 and 22 protruding outwards on their outer surfaces, respectively, and a larger-diameter portion 24 of a hollow output shaft 23 extending through the rotor chamber 14 is rotatably supported on the hollow bearing tubes 21 and 22 with a metal bearing 25 interposed therebetween. Thus, an axis L of the output shaft 23 passes through an intersection between longer and shorter diameters in the substantially elliptic rotor chamber 14.

A circular rotor 31 is accommodated in the rotor chamber 14, and a shaft-mounting bore 32 in the center of the rotor 31 and a larger-diameter portion 24 of the output shaft 23 are fitted with each other, with meshed portions 33 provided between the rotor 31 and the larger-diameter portion 24. Thus, a rotational axis of the rotor 31 is matched with the axis L of the output shaft 23 and hence, is designated by "L".

A plurality of, e.g., twelve (in the present embodiment) slot-shaped spaces 34 are defined at circumferentially equal distances in the rotor 31 to extend radially from the shaft-mounting bore 32 about the rotational axis L. Each of the spaces 34 is of a substantially U-shape within a phantom plane perpendicular to opposite end faces 35 of the rotor 31, so that it has a small circumferential width and continuously opens into the opposite end faces 35 and an outer peripheral surface 36 of the rotor 31.

First to twelfth vane piston units U1 to U12 of the same structure are mounted within the slot-shaped spaces 34 for reciprocal movement in a radial direction as described below. In each of the substantially U-shaped spaces 34, a stepped bore 38 is defined in a portion 37 defining an inner periphery of the space 34, and a stepped cylinder member 39 made of a ceramic material is fitted into the stepped bore 38. The cylinder member 39 has a smaller-diameter portion $\underline{a}$ whose end face abuts against the outer peripheral surface of the larger-diameter portion 24 of the output shaft 23, and a smaller-diameter bore $\underline{b}$ communicating with a through-bore $\underline{c}$ opening into the outer peripheral surface of the larger-diameter portion 24. A guide tube 40 is disposed outside the cylinder member 39 so as to be located coaxially with the member 39. The guide tube 40 has an outer end locked in an opening of the space 34 located in the outer peripheral surface of the rotor 31, and an inner end fitted into a larger-diameter bore portion $\underline{d}$ of the stepped bore 38 to abut against the cylinder member 39. The guide tube 40 also has a pair of elongated grooves $\underline{e}$ extending in an opposed relation from its outer end to near its inner end and facing the space 34. A piston 41 made of a ceramic material is slidably received in a larger-diameter cylinder bore $\underline{f}$ in the cylinder member 39, and has a tip end usually located in the guide tube 40.

Figure 2:
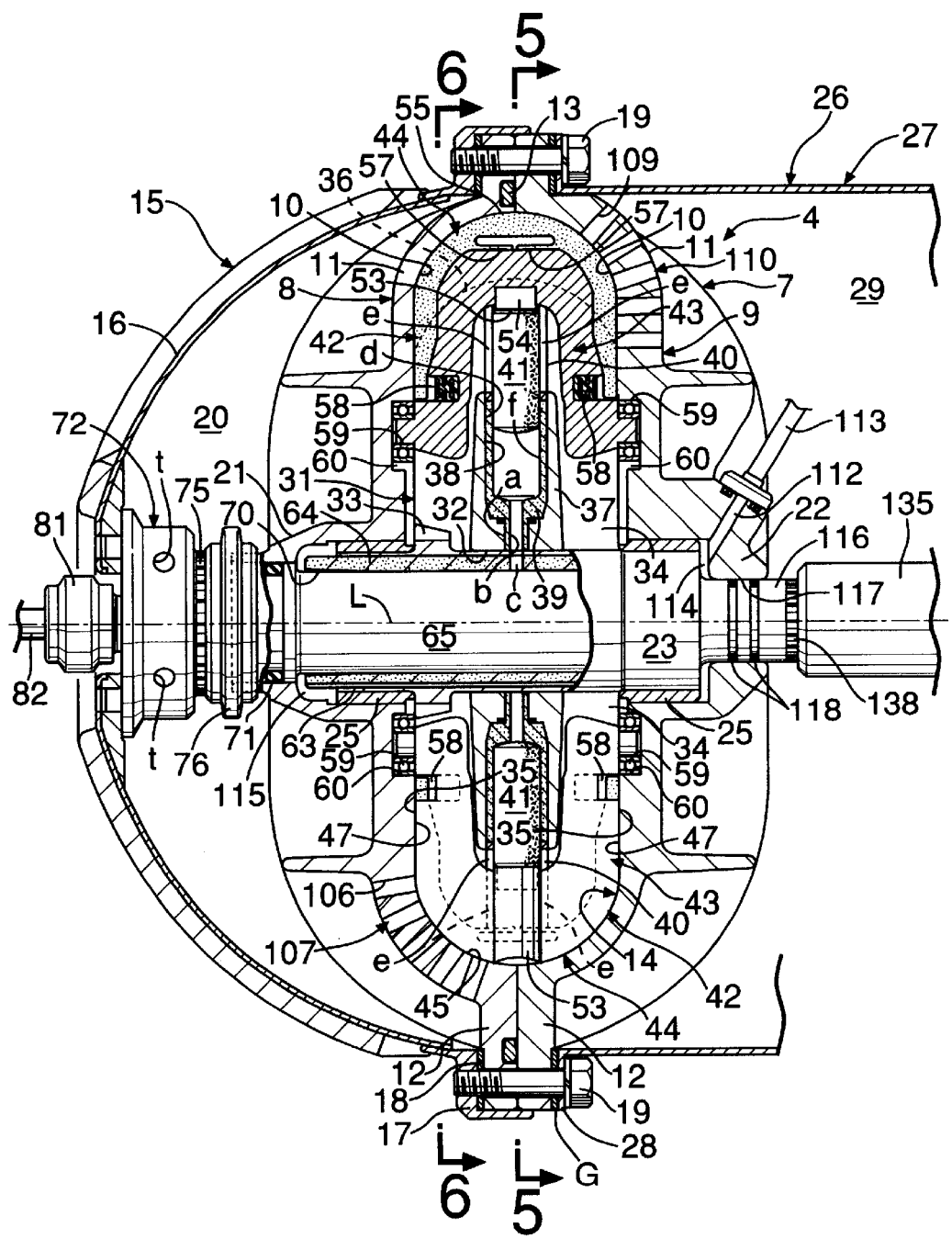
FIG. 2 is a vertical sectional view of an expander, taken along a line 2—2 in FIG. 6.
Figure 7:
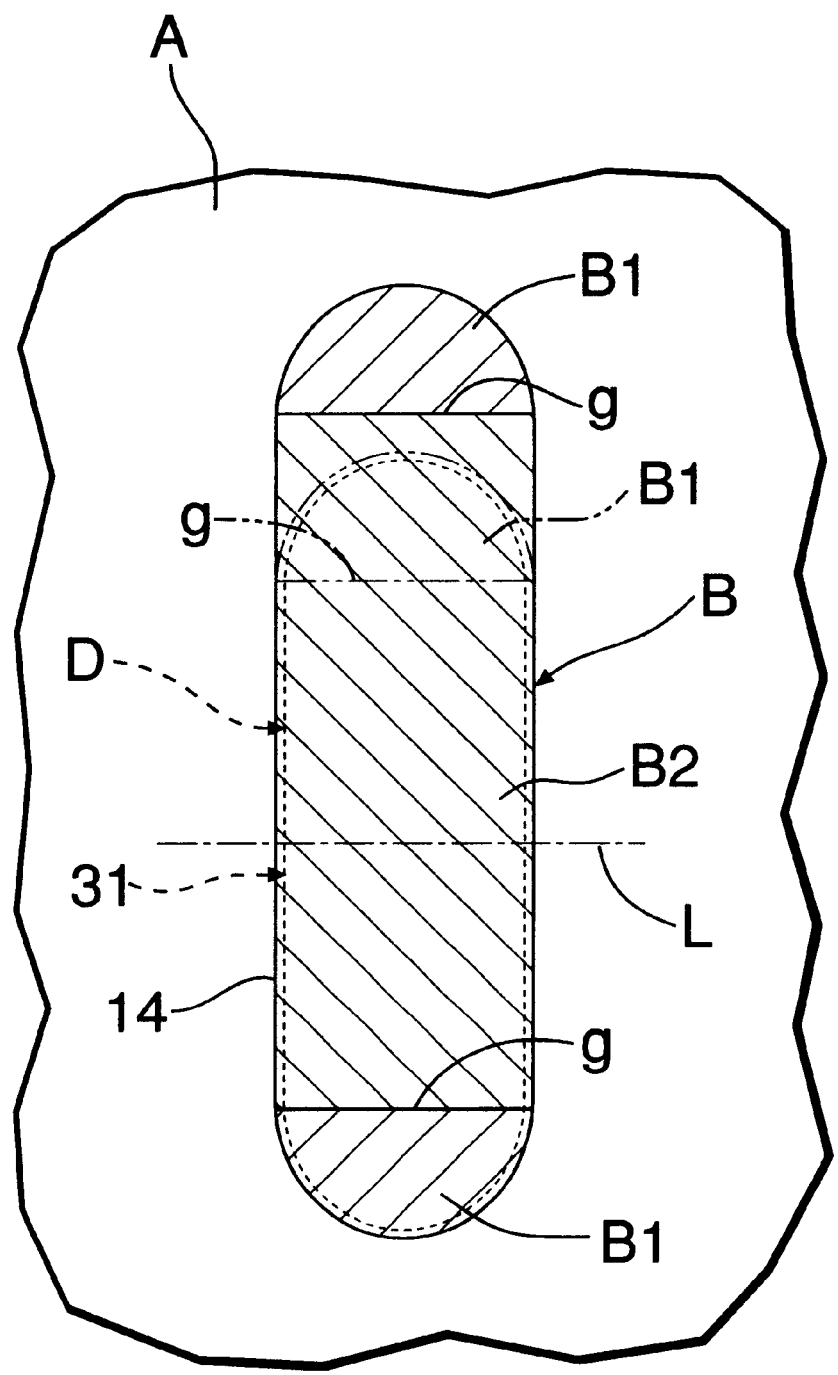
FIG. 7 is a diagram showing sectional shapes of rotor chamber and a rotor.
Figure 8:
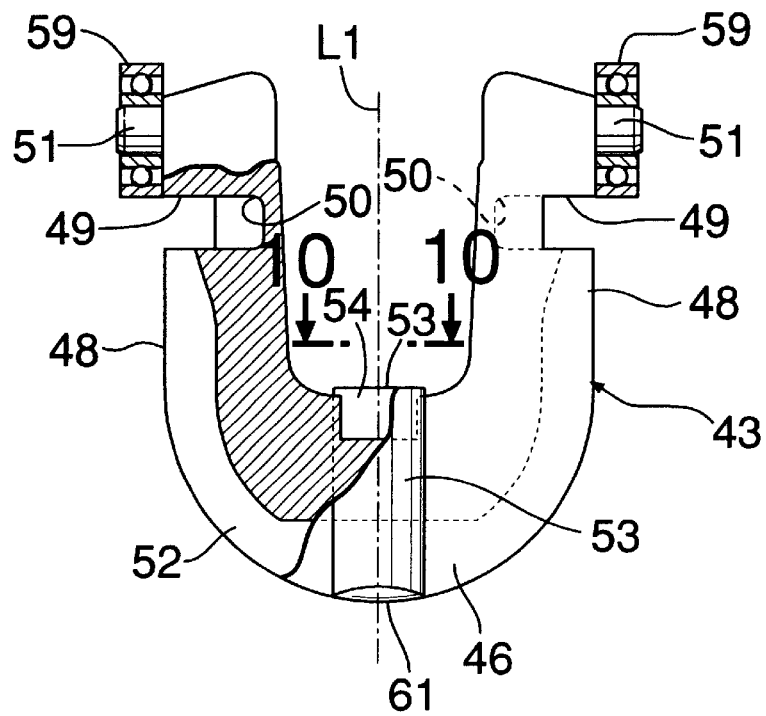
FIG. 8 is a front view of a vane body.
Figure 9:
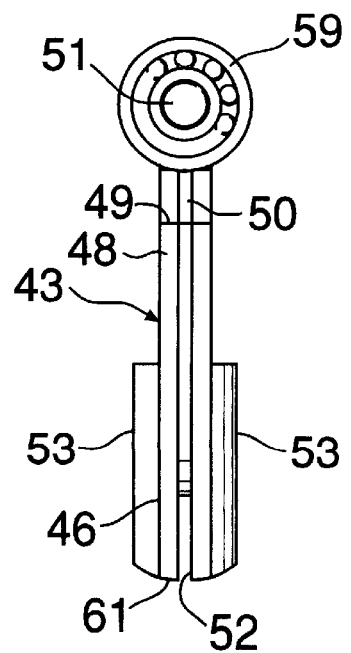
FIG. 9 is a side view of the vane body.
Figure 10:
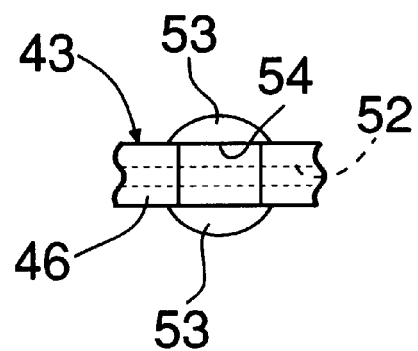
FIG. 10 is a sectional view taken along a line 10—10 in FIG. 8.
Figure 11:
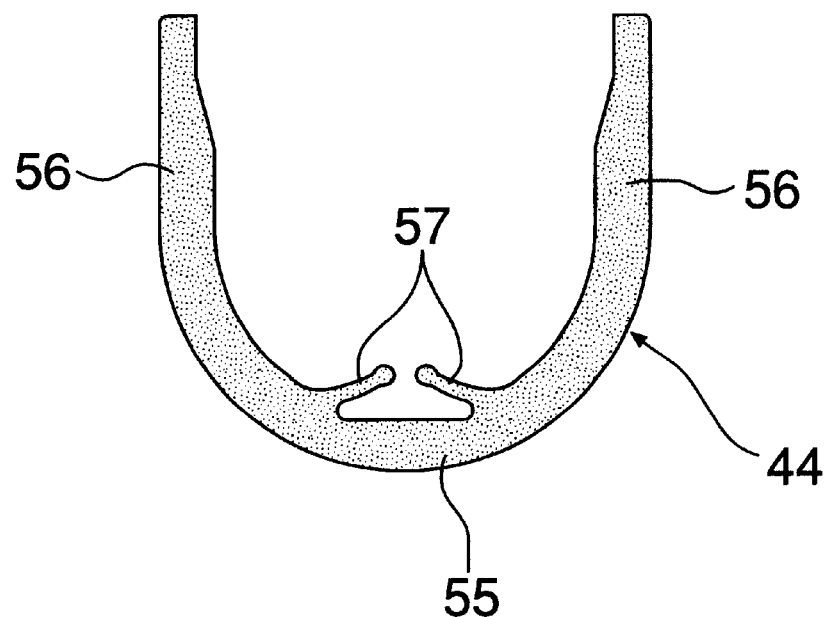
FIG. 11 is a front view of a seal member.

As shown in FIGS. 2 and 7, a section B of the rotor chamber 14 in a phantom plane $\underline{A}$ including the rotational axis L of the rotor 31 comprises a pair of semi-circular sectional portions B1 with diameters $\underline{g}$ opposed to each other, and a quadrilateral sectional portion B2 formed to connect opposed ends of the diameters $\underline{g}$ of the semi-circular sectional portions B1 to each other and to connect the other opposed ends to each other. The section B is formed into a shape substantially similar to a racing track. In FIG. 7, a portion shown by a solid line indicates the largest section including a longer diameter, while a portion shown in part by a two-dot dashed line indicates the smallest section including a shorter diameter. The rotor 31 has a section D slightly smaller than the smallest section including the shorter diameter of the rotor chamber 14, as shown by dotted line in FIG. 7.

As clearly shown in FIGS. 2, 6 and 8 to 11, a vane 42 is comprised of a vane body 43 in the form of a substantially U-shaped plate, and a seal member 44 in the form of a substantially U-shaped plate mounted to the vane body 43.

The vane body 43 includes a semi-arcuate portion 46 which is opposed to an inner peripheral surface 45 formed by the semi-circular sectional portions B1 of the rotor chamber 14 and is usually spaced apart from the inner peripheral surface 45, and a pair of parallel portions 48 which are opposed to opposed inner end faces 47 formed by the quadrilateral sectional portion B2 and are usually spaced apart from the opposed inner end faces 47. A rectangular U-shaped notch 49 is provided in an end of each of the parallel portions 48; a quadrilateral blind bore 50 opens into a bottom surface of the notch 49, and a short shaft 51 is mounted at a location displaced from each of the notches 49 to the end to protrude outwards. In addition, a U-shaped groove 52 is defined continuously in outer peripheries of the semi-arcuate portion 46 and the parallel portions 48 to open outwards, and communicates at its opposite ends with the notches 49, respectively. Further, a pair of projections 53 in arched section are provided on flat surface areas of the semi-arcuate portion 46. The projections 53 are disposed so that an axis L1 of a phantom column formed by the projections 53 is matched with a straight line bisecting the distance between the parallel portions 48 and bisecting the semi-arcuate portion 46 circumferentially. Inner ends of the projections 53 protrude slightly into a space between the parallel portions 48, and a gap 54 between the projections 53 extends into the semi-arcuate portion 46.

The seal member 44 is formed of PTFE and includes a semi-arcuate portion 55 sliding on the inner peripheral surface 45 formed by the semi-circular sectional portions B1 of the rotor chamber 14, and a pair of parallel portions 56 sliding on the opposed inner end faces 47 formed by the quadrilateral sectional portion B2. A pair of resilient claws 57 are provided on an inner peripheral surface of the semi-arcuate portion 55 so as to be curved inwards.

The seal member 44 is mounted in the U-shaped groove 52 in the vane body 43, and a spring 58 is fitted into each of the blind bores 50. Further, a roller 59 having a ball bearing structure is mounted to each of the short shafts 51. Each of the vanes 42 is slidably accommodated in each of the slot-shaped spaces 34 in the rotor 31. In this case, the projections 53 of the vane body 43 are located within the guide tube 40, with their opposite side portions located in the elongated grooves $\underline{e}$ in the guide tube 40, respectively, whereby inner end faces of the projections 53 can be put into abutment against outer end faces of the pistons 41. The rollers 59 are rollably engaged in elliptic annular grooves 60 defined in opposed inner end faces 47 of the first and second halves 8 and 9, respectively. The elliptic shape of the annular grooves 60 has an analogous relationship to the elliptic shape of the rotor chamber 14.

Figure 6:
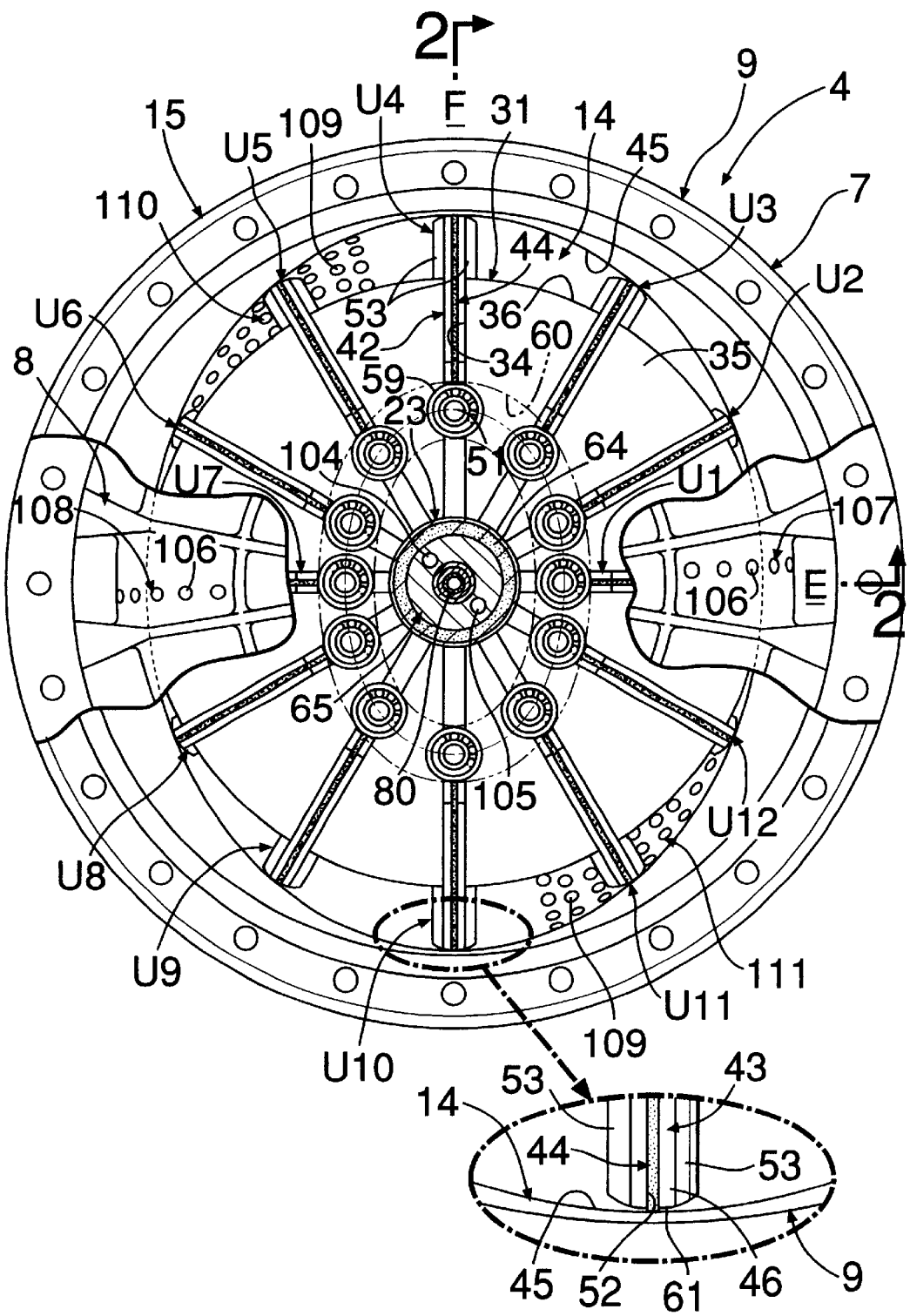
FIG. 6 is an enlarged sectional view of essential portions, taken along a line 6—6 in FIG. 2.

As clearly shown in FIG. 6, the semi-arcuate tip end face 61 of the semi-arcuate portion 46 of the vane body 43 is usually spaced apart from the inner peripheral surface 45 of the rotor chamber 14, and the parallel portions 48 are usually spaced apart from the opposed inner end faces of the rotor chamber 14, respectively, by the cooperation of the rollers 59 and the annular grooves 60 with each other, thereby providing a reduction in friction loss. In addition, as clearly shown in FIG. 2, the parallel portions 56 of the seal member 44 are brought into close contact with the opposed inner end faces 47 of the rotor chamber 14 by the repulsing forces of the springs 58, and the semi-arcuate portion 55 is brought into closed contact with the inner peripheral surface 45 by the resilient claws 57 pushed between the vane body 43 and the inner peripheral surface 45 within the rotor chamber 14. Thus, a good sealability is provided between the vane 42 and the rotor chamber 14.

Figure 4:
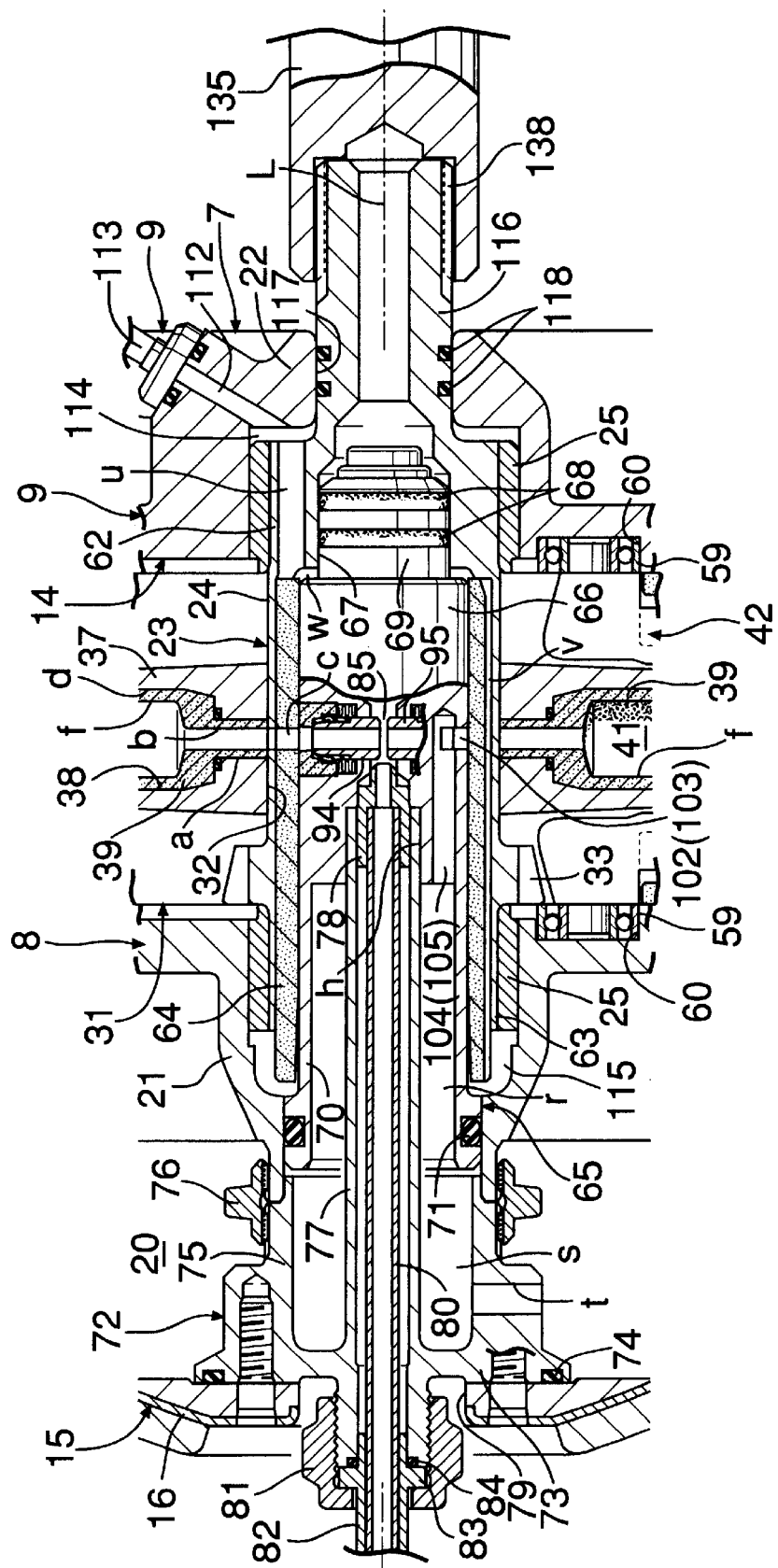
FIG. 4 is an enlarged sectional view of portions around a rotational axis shown in FIG. 2.

Referring to FIGS. 2 and 4, the larger-diameter portion 24 of the output shaft 23 includes a thicker portion 62 supported on the metal bearing 25 of the second half 9, and a thinner portion 63 extending from the thicker portion 62 and supported on the metal bearing 25 of the first half 8. A hollow shaft 64 made of a ceramic material is received in the thinner portion 63, so that it can be integrally rotated with the output shaft 23. A stationary shaft 65 is disposed inside the hollow shaft 64 and comprises a larger-diameter solid portion 66 fitted in the hollow shaft 64 to extend within the axial thickness of the rotor 31, a smaller-diameter solid portion 69 fitted in a bore 67 provided in the thicker portion 62 of the output shaft 23 with two seal rings 68 interposed therebetween, and a thinner hollow portion 70 extending from the larger-diameter solid portion 66 and fitted in the hollow shaft 64. A seal ring 71 is interposed between an outer peripheral surface of an end of the hollow portion 70 and the inner peripheral surface of the hollow bearing tube 21 if the first half 8.

An end wall 73 of a hollow tubular member 72 located coaxially with the output shaft 23 is mounted to an inner surface of a central portion of the main body 16 of the shell-shaped member 15 with a seal ring 74 interposed therebetween. A shorter outer tube portion 75 extending inwards from an outer periphery of the end wall 73 is connected at its inner end to the hollow bearing tube 21 of the first half 8 through a connecting tube 76. A long inner tube portion 77 having a small diameter is provided on the end wall 73 to extend through the end wall 73 and fitted at its inner end into a stepped bore $h$ provided in the larger-diameter solid portion 66 of the stationary shaft 65 along with a short hollow connecting pipe 78 protruding from the inner end of the inner tube portion 77. An outer end of the inner tube portion 77 protrudes outwards from a bore 79 in the shell-shaped member 15, and a raised temperature/pressure vapor-introducing pipe 80 inserted from such outer end portion through the inner tube portion 77 is fitted at its inner end into the hollow connecting pipe 78. A cap member 81 is threadedly fitted over the outer end of the inner tube portion 77, and a flange 83 of a holder tube 82 for retaining the introducing pipe 80 is press-attached to an outer end face of the inner tube portion 77 by the cap member 81 with a seal ring 84 interposed therebetween.

Figure 12:
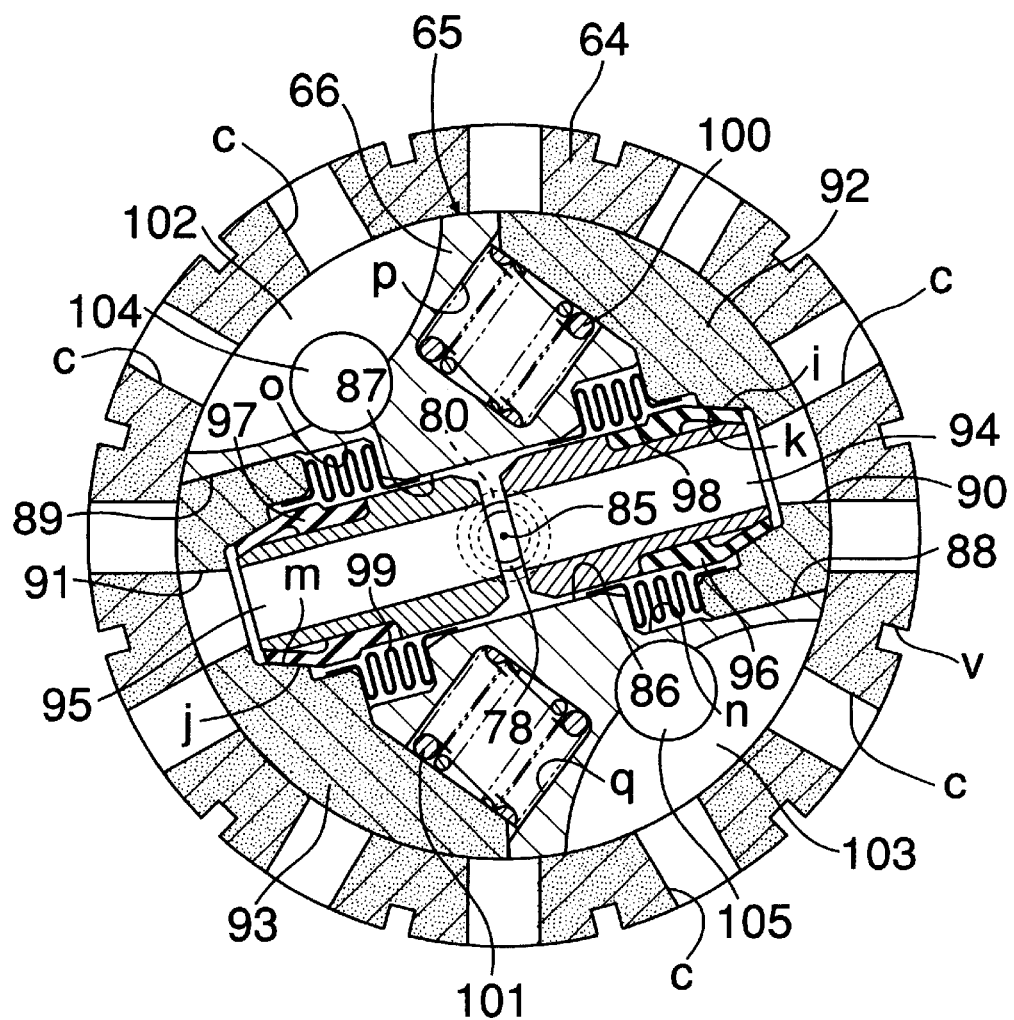
FIG. 12 is an enlarged view of the portions around the rotational axis shown in FIG. 5.

As shown in FIGS. 2, 4, 5 and 12, the larger-diameter solid portion 66 of the stationary shaft 65 is provided with a mechanism for supplying raised-temperature/pressure vapor through a plurality of, e.g., twelve (in the embodiment) through-bores $c$ defined in series in the hollow shaft 64 and the output shaft 23 to the cylinder members 39 of the first to twelfth vane piston units U1 to U12 and for discharging a first dropped-temperature/pressure vapor generated after expansion from the cylinder members 39 through the through-bores $c$. The mechanism is provided in the following manner:

As best shown in FIG. 12, first and second bores 86 and 87 are defined in the larger-diameter solid portion 66 to extend in opposite directions from a space 85 communicating with the hollow connecting pipe 78. The first and second bores 86 and 87 open into bottom surfaces of first and second recesses 88 and 89 opening into the outer peripheral surface of the larger-diameter solid portion 66. First and second seal blocks 92 and 93 made of carbon and having supply ports 90 and 91 are mounted in the first and second recesses 88 and 89, respectively, with their outer peripheral surfaces put into sliding contact with the inner peripheral surface of the hollow shaft 64. Short first and second supply pipes 94 and 95 coaxial with each other are inserted loosely into the first and second bores 86 and 87, and tapered outer peripheral surfaces $i$ and $j$ of first and second seal tubes 96 and 97 fitted over outer peripheral surfaces of tip ends of the first and second supply pipes 94 and 95 are fitted to inner peripheral surfaces of tapered bores $k$ and $m$ located inside the supply ports 90 and 91 in the first and second seal blocks 92 and 93 and leading to the supply ports 90 and 91, respectively. First and second annular recesses $n$ and $o$ surrounding the first and second supply pipes 94 and 95 and first and second blind bore-shaped recesses $p$ and $q$ adjoining the first and second annular recesses $n$ and $o$ are defined in the larger-diameter solid portion 66 to face the first and second seal blocks 92 and 93. First and second bellows-shaped elastic members 98 and 99 are accommodated in the first and second annular recesses $n$ and $o$, and first and second coil springs 100 and 101 are accommodated in the first and second blind bore-shaped recesses $p$ and $q$, respectively, so that the first and second seal blocks 92 and 93 are pushed to the inner peripheral surface of the hollow shaft 64 by repulsing forces of the first and second bellows-shaped elastic members 98 and 99 and the first and second coil springs 100 and 101.

In the larger-diameter solid portion 66, first and second recess-shaped discharge portions 102 and 103 usually communicating with the two through-bores $c$ and first and second discharge bores 104 and 105 are defined between the first coil spring 100 and the second bellows-shaped elastic member 99 and between the second coil spring 101 and the first bellows-shaped elastic member 98. The first and second discharge bores 104 and 105 extend from the discharge portions 102 and 103 in parallel to the introducing pipe 80 and open into a hollow $r$ of the stationary shaft 65.

The members of the same type affixed respectively with the terms "first" and "second" such as the first seal block 92 and the second seal block 93 are in a point symmetric relation to each other with respect to an axis of the stationary shaft 65.

The inside of the hollow $r$ of the stationary shaft 65 and the inside of the outer tube portion 75 of the hollow tubular member 72 are passages $s$ for the first dropped-temperature/pressure vapor, and the passages $s$ communicate with the expansion chamber 20 through a plurality of through-bores $t$ made through the peripheral wall of the outer tube portion 75.

As shown in FIGS. 2 and 6, first and second inlet bore groups 107 and 108 each comprising a plurality of inlet bores 106 arranged radially are defined in the outer periphery of the main body 11 of the first half 8 in the vicinity of opposite ends of a shorter diameter of the rotor chamber 14, so that a second dropped-temperature/pressure vapor having a temperature and a pressure dropped in the expansion chamber 20 is introduced into the rotor chamber 14 through the inlet bore groups 107 and 108. A first outlet bore group 110 comprising a plurality of outlet bores 109 is defined in the outer periphery of the main body 11 of the second half 9 between one longer-diameter end of the rotor chamber 14 and the second inlet bore group 108, so that the outlet bores are arranged radially and circumferentially and communicate with the recovery chamber 29, and a second outlet bore group 111 comprising a plurality of outlet bores 109 is defined in the outer periphery of the main body 11 of the second half 9 between the other longer-diameter end and the first inlet bore group 107, so that the outlet bores 109 are likewise arranged radially and circumferentially and communicate with the recovery chamber 29. A third dropped-temperature/pressure vapor having a temperature and a pressure further dropped by the expansion between the adjacent vanes 42 is discharged from the first and second outlet bore groups 110 and 111 into the recovery chamber 29.

The output shaft 23 and the like are lubricated by water, and a passage for such lubricating water is formed in the following manner: As shown in FIGS. 2 and 4, a water feed pipe 113 is connected to a water feed bore 112 defined in the hollow bearing tube 22 of the second half 9 and is retained on the cover member 26 with a seal member (not shown) interposed therebetween. The water feed bore 112 communicates with a housing 114 faced by the metal bearing 25 of the second half 9, and the housing 114 communicates with a water bore u, which is defined in the thicker portion 62 of the output shaft 23 and communicates with a plurality of water grooves v (see also FIG. 12) extending in a direction of a generating line of the outer peripheral surface of the hollow shaft 64. Further, the water grooves v communicate with a housing 115 faced by the metal bearing 25 of the second half 8. An annular recess w is provided in the inner end face of the thicker portion 62 of the output shaft 23 to permit the communication of the water bore u with sliding portions between the hollow shaft 64 and the larger-diameter solid portion 66 of the stationary shaft 65.

Thus, the lubrication between the metal bearings 25 and the output shaft 23 as well as between the hollow shaft 64 and the stationary shaft 65 is conducted by the water, and the lubrication between the casing 7 and seal member 44 as well as the rollers 59 is conducted by the water passed through a gap between each of the metal bearings 25 and the output shaft 23 into the rotor chamber 14.

Referring to FIGS. 2 and 4, a smaller-diameter portion 116 which is an end portion of the output shaft 23 protrudes into the recovery chamber 29 from a bore 117 provided in the hollow bearing tube 22 of the second half 9, whereby the periphery of the smaller-diameter portion 116 is sealed against the outside by the cover member 26. The smaller-diameter portion 116 and the bore 117 are sealed against each other by two seal rings 118. A transmitting shaft 119 of a driven member in the outside of the cover member 26 is disposed coaxially with the output shaft 119.

The smaller-diameter portion 116 of the output shaft 23 protruding from the second half 9 and the transmitting shaft 119 are connected to each other by a connecting member, e.g., a magnet-type shaft coupling 120 having a simple structure in the embodiment to be able to transmit a power. A structure of such connection is as described below. The cover member 26 is formed of a non-magnetic stainless steel (e.g., JIS SUS304, SUS310, SUS316 or the like) and comprises a larger-diameter tube 121 on the side of the second half 9, an outer smaller-diameter tube 122 and an intermediate tube 123 located between the larger-diameter tube 121 and the outer smaller-diameter tube 122. The intermediate tube 123 is formed by superposing two circular flanges 124 and 125 of the larger-and smaller-diameter tubes 121 and 122 one on another with a gasket 126 interposed therebetween and fastening them to each other at a plurality of circumferential points by bolts 127. On the side of an inner periphery of the intermediate tube 123, there are a boss 128 and a plurality of reinforcing arms 129 extending radially from the boss 128 to an inner peripheral surface of the intermediate tube 123. The smaller-diameter tube 122 has smaller-diameter inner tube portion 131 extending inwards from a center portion of an end wall 130 of the smaller-diameter tube 122, and the inside of the smaller-diameter tube 122 is divided by a partition wall 132 into two portions; a portion adjacent the recovery chamber 29 and a portion adjacent an outer portion. The boss 128 and the inner tube portion 131 are disposed coaxially with the output shaft 23.

The magnet-type shaft coupling 120 includes a first component 133 disposed within the recovery chamber 29, and a second component 134 disposed outside the recovery chamber 29. The first component 133 comprises a connecting shaft 135, a magnet holder 136 integral with the connecting shaft 135, and a permanent magnet 137 retained in the magnet holder 136. The connecting shaft 135 is connected at one end thereof to the smaller-diameter portion 116 of the output shaft 23 within the larger-diameter tube 121 through a spline-coupling 138 and supported at the other end thereof on the boss 128 and the inner tube portion 131 with bearings 139 and 140 interposed therebetween, respectively. The magnet holder 136 has an annular plate 141 connected at its inner periphery to the bearings 139 and 140 of the connecting shaft 135. A smaller-diameter tube portion 142 is projectingly provided at a radially intermediate portion of the annular plate 141 to surround the inner tube portion 131. The permanent magnet 137 is of a hollow cylindrical shape and has a bore 143 fitted over the smaller-diameter tube portion 142 and coupled to an outer peripheral surface of the smaller-diameter tube portion 142. The permanent magnet 137 also has an annular end face 144 coupled in an abutting manner to a half of an outer periphery of the annular plate 141. Thus, the outer peripheral surface of the permanent magnet 137 is in proximity to the inner peripheral surface of the smaller-diameter tube 122 made of a non-magnetic stainless steel capable of transmitting a magnetic force therethrough. The permanent magnet 137 may comprise a plurality of N-pole pieces and a plurality of S-pole pieces alternately arranged in an annular configuration and may be coupled to the outer peripheral surface of the smaller-diameter portion 142 and the half of the outer periphery of the annular plate 141.

The second component 134 is comprised of a connecting shaft, a magnet holder 145 integral with the connecting shaft, and a permanent magnet 146 retained in the magnet holder 145, basically as is the first component 133, but in the embodiment, the transmitting shaft 119 also serves as the connecting shaft. The transmitting shaft 119 is supported at one end thereof on the inner tube portion 131 with a bearing 147 interposed therebetween. The magnet holder 145 includes an annular end plate 148 whose inner periphery is connected to the transmitting shaft 119, and a larger-diameter tube portion 149 connected to an outer peripheral edge of the annular end plate 148 to surround the smaller-diameter tube 122 with a predetermined distance left therebetween. The permanent magnet 146 is of a hollow cylindrical shape and fitted into the larger-diameter tube portion 149 with its outer periphery coupled to an inner peripheral surface of the larger-diameter tube portion 149. An annular end face 150 is also coupled in an abutting manner to an inner surface of an outer periphery of the annular end plate 148. Thus, the permanent magnet 146 has an inner peripheral surface located in proximity to the outer peripheral surface of the smaller-diameter tube 122 capable of transmitting a magnetic force therethrough, and surrounds the permanent magnet 137 of the first component 133 with the smaller-diameter tube 122 interposed therebetween. Therefore, the smaller-diameter portion 116 of the output shaft 23 and the transmitting shaft 119 are connected to each other by attracting forces of the permanent magnets 137 and 146. The permanent magnet 146 may comprise a plurality of N-pole pieces and a plurality of S-pole pieces alternately arranged in an annular configuration and may be coupled to the inner peripheral surface of the larger-diameter tube portion 149 and an inner surface of an outer periphery of the annular end plate 148.

Both of the first component comprising the plurality of reinforcing arms 129 and the bearing 139 and the second component comprising the bearing 140 and a substantial half of the inner tube portion 131 retaining the bearing 140 are not necessarily required, and one of the components may be omitted.

If the cover member 26 and the magnet-type shaft coupling 120 are used as described above, the output shaft 23 and the transmitting shaft 119 of the driven member can be connected to each other with the periphery of the smaller-diameter portion 116 of the output shaft 23 sealed, so that a power can be transmitted.

In the recovery chamber 29, a space is provided between the second half 9 of the expander 4 and the permanent magnet 137 to communicate with the duct 30. Therefore it is possible to inhibit the propagation of heat of the heated expander 4 to the permanent magnet 137 to prolong the life of the permanent magnet 137.

Further, the smaller-diameter tube 122 retains the connecting shaft 135 and the transmitting shaft 119 coaxially, with the bearings 140 and 147 interposed therebetween. Therefore, the permanent magnet 137 on the side of the connecting shaft 135 and the permanent magnet 146 on the side of the transmitting shaft 119 can be disposed concentrically, and a clearance between the permanent magnets 137 and 146 can be maintained uniformly over the entire peripheries of the permanent magnets 137 and 146, whereby the transmission of the power can be carried out smoothly.

If the first component including the reinforcing arms 129 is omitted, then it is easy to align the connecting shaft 135 and the transmitting shaft 119 with the output shaft 23, because the smaller-diameter tube 122 retaining the connecting shaft 135 and the transmitting shaft 119 coaxially is fixed by the bolts 127.

Likewise, if the first component including the reinforcing arms 129 is omitted, then a sufficient rigidity can be provided to the smaller-diameter tube 122 retaining the two shafts 135 and 119, if the cover member 26 is formed of a non-magnetic stainless steel.

Further, if the second component including the bearing 140 is left or omitted, then the rigidity of the smaller-diameter tube 122 can be reduced, if the connecting shaft 135 is supported on the boss 128 of the reinforcing arms 129 with the bearing 139 interposed therebetween. Therefore, the smaller-diameter tube 122 can be formed of a light-weight material having an excellent corrosion resistance such as a synthetic resin.

Yet further, if the cover member 26 is formed in a combination comprising the larger-diameter tube 121 and the smaller-diameter tube 122, then the assemblability of the relatively heavy magnet-type shaft coupling 120 can be improved. For example, the assembling of the magnet-type shaft coupling 120 is carried out sequentially by connecting the first component 133 to the output shaft 23, fastening the smaller-diameter tube 122 to the larger-diameter tube 121 and coupling the second component 134 to the smaller-diameter tube 122.

Figure 5:
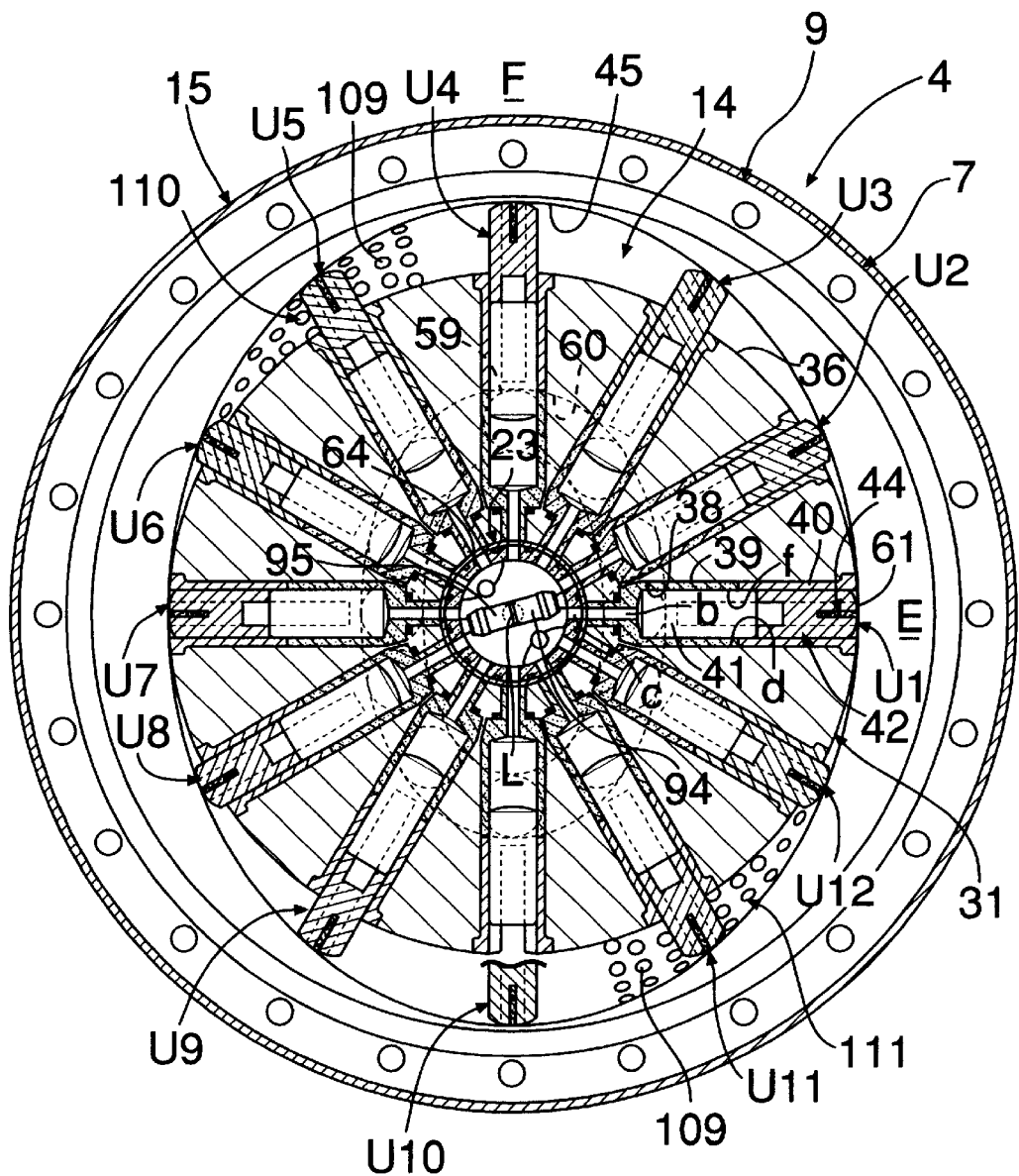
FIG. 5 is a sectional view taken along a line 5—5 in FIG. 2.

Referring to FIG. 5, the first and seventh vane piston units U1 and U7 having a relationship of point symmetry to each other with respect to the rotational axis L of the rotor 31 are operated in a similar manner. This also applies to the second and eighth vane piston units U2 and U8 having a relationship of point symmetry to each other.

For example, referring also to FIG. 12, an axis of the first supply pipe 94 is slightly deviated in a counterclockwise direction as viewed in FIG. 5 from a shorter-diameter position E of the rotor chamber 14, and the first vane piston unit U1 is located in the shorter-diameter position E, and the raised-temperature/pressure vapor is not supplied to a larger-diameter cylinder bore $\underline{f}$ in the first vane piston unit U1. Therefore, the piston 41 and the vane 42 are in their retracted positions.

When the rotor 31 is slightly rotated from this state in the counterclockwise direction, the supply port 90 in the first seal block 92 and the through-bore c are put into communication with each other, whereby the raised-temperature/pressure vapor is introduced from the introduction pipe 80 into the larger-diameter cylinder bore $\underline{f}$ through the smaller-diameter bore $\underline{b}$. This causes the piston 41 to be advanced, and this advancing movement of the piston 41 is converted into the rotating movement of the rotor 31 by the sliding movement of the vane 42 to a longer-diameter position F in the rotor chamber 14. If the through-bore $\underline{c}$ is deviated from the supply port 90, the raised-temperature/pressure vapor is expanded within the larger-diameter cylinder bore $\underline{f}$ to further advance the piston 41, whereby the rotation of the rotor 31 is continued. When the first vane piston unit U1 reaches the longer-diameter position F in the rotor chamber 14, the expansion of the raised-temperature/pressure vapor is finished. Thereafter, the first dropped-temperature/pressure vapor within the larger-diameter cylinder bore $\underline{f}$ is discharged via the smaller-diameter bore $\underline{b}$, the through-bore $\underline{c}$, the first recess-shaped discharge portion 102, the first discharge bore 104, the passage s (see FIG. 4) and the through-bore $\underline{t}$ into the expansion chamber 20 with the rotation of the rotor 31 due to the retraction of the piston 41 by the vane 42. The second dropped-temperature/pressure vapor generated by the further expansion of the first dropped-temperature/pressure vapor in the expansion chamber 20 and having a dropped temperature and pressure is introduced into the rotor chamber 14 through the first inlet bore group 107, as shown in FIGS. 2 and 6 and further expanded between the adjacent vanes 42 to rotate the rotor 31. Thereafter, a third dropped-temperature/pressure vapor is discharged into the recovery chamber 29 through the first outlet bore group 110. In this manner, an output power is provided from the output shaft 23 by operating the piston 41 by the expansion of the raised-temperature/pressure vapor to rotate the rotor 31 through the vane 42 and by expanding the dropped-temperature/pressure vapor due to the dropping of the pressure of the raised-temperature/pressure vapor to rotate the rotor 31 through the vane 42. Such output power is transmitted to the transmitting shaft 119 through the magnet-type shaft coupling 120.

If the raised-temperature/pressure vapor is leaked from the sealed portion of the output shaft 23 in the casing 7, namely, from the positions of the two seal rings 118, such raised-temperature/pressure vapor is recovered by the cover member 26 and hence, cannot be leaked to the outside. Further, the collected raised-temperature/pressure vapor is converted into the dropped-temperature/pressure vapor within the cover member 26, namely, within the recovery chamber 29. Such dropped-temperature/pressure vapor is fed to the condenser 5 along with the third dropped-temperature/pressure vapor fed from the outlet bore 109. Thus, it is possible to avoid the reduction in amount of the operating medium to maintain the Rankin cycle.

Figure 3:
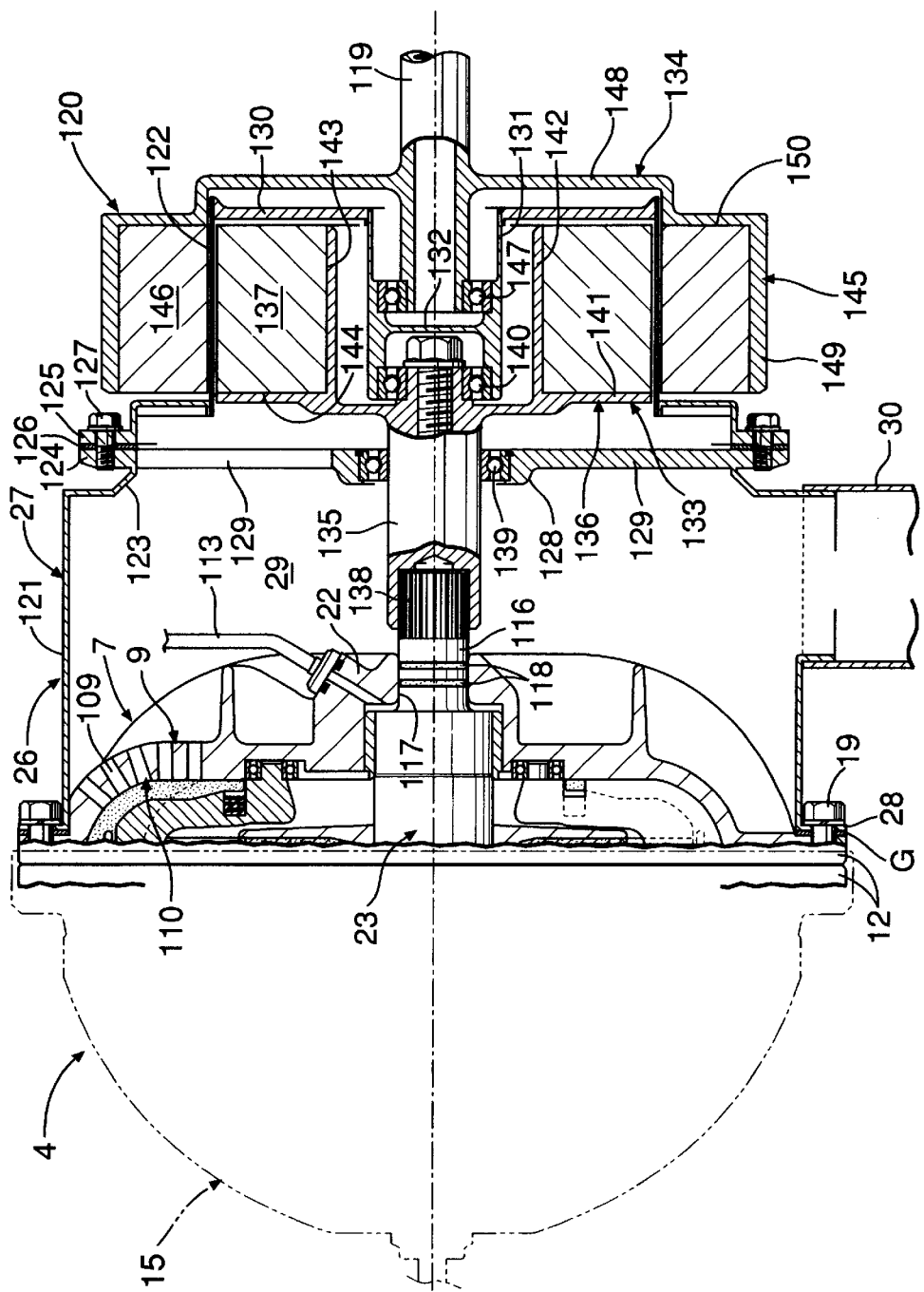
FIG. 3 is a sectional view of one example of a structure of connection between an output shaft and a transmitting shaft.
Figure 13:
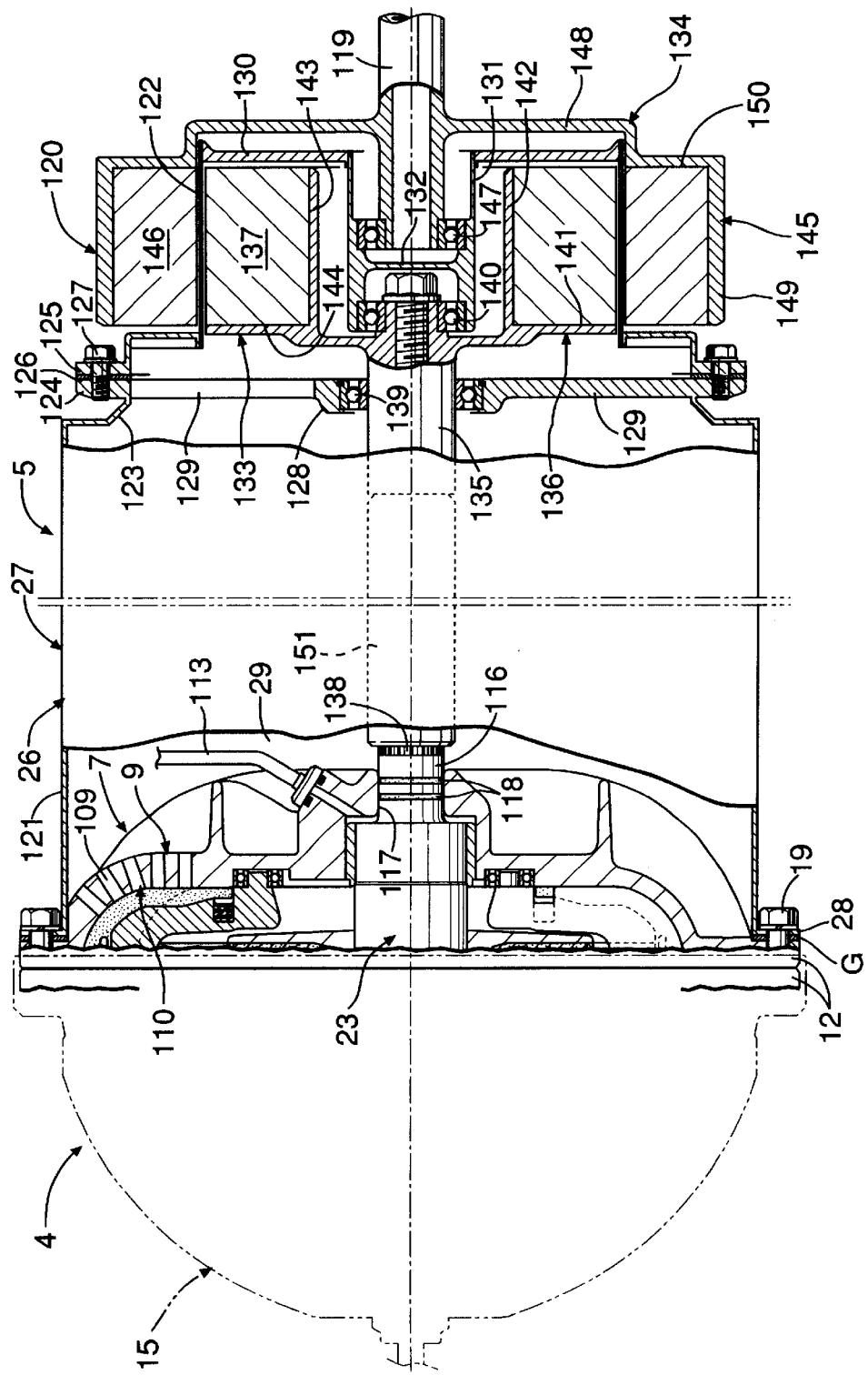
FIG. 13 is a sectional view similar to FIG. 3, but showing another example of a structure of connection between the output shaft and the transmitting shaft.

FIG. 13 shows an example in which the condenser 5 is disposed adjacent the expander 4. In this case, the cover member 26 also serves as a housing for the condenser 5, and the smaller-diameter portion 116 of the output shaft 23 in the expander 4 is connected to the connecting shaft 135 of the first component 133 in the magnet-type shaft coupling 120 through a long shaft 151 extending within the housing of the condenser 5. In this example, the heavy condenser 5 can be assembled to the expander 4 and then, the magnet-type shaft coupling 120 can be assembled in the same manner as described above. Therefore, a further remarkable effect is provided by forming the cover member 26 in a combined manner. Portions or components in FIG. 13 corresponding to those in FIG. 3 are designated by like reference numerals and characters, and the detailed description of them is omitted.

In an expander in which an energy of expansion of a vapor having a raised pressure is converted into a rotating energy for an output shaft, a cover member is mounted on an outer surface of a casing of the expander. The cover member has a function of sealing an end of the output shaft protruding on the outer surface of the casing against the outside and a function of recovering vapor discharged from the casing and having a dropped pressure after the conversion. The end of the output shaft located within the cover member and a transmitting shaft of a driven member disposed outside the cover member are connected to each other through a magnet-type shaft coupling, so that a power can be transmitted. Thus, the output shaft and the transmitting shaft of the driven member can be connected to each other to prevent the leakage of the vapor in the expander to the outside.

What is claimed is:

1. A structure of connection between an output shaft of an expander and a transmitting shaft of a driven member, comprising:

an output shaft;

a power transmitting member; and a cover member mounted to a flange extending from an outer surface of an expander casing, wherein said cover member is disposed entirely between said casing flange and said power transmitting member, wherein expansion energy of a vapor having a raised pressure is converted into a rotating energy for the output shaft, wherein said cover member seals an end of said output shaft protruding from the outer surface of said casing, and recovers vapor discharged from said casing, wherein said discharged vapor has a dropped pressure after said conversion, and wherein said power transmitting member transmits power non-contactingly between the end of said output shaft located within said cover member and the transmitting shaft of the driven member disposed outside said cover member, wherein a power can be transmitted.

2. A structure of connection between an output shaft of an expander and a transmitting shaft of a driven member according to claim 1, wherein said power transmitting member is a magnet-type shaft coupling.

3. A structure according to claim 1, wherein said cover member defines a dropped-temperature/pressure recovery chamber between said casing and said power transmitting member.

4. A structure according to claim 1, wherein said casing is tubular in shape.

5. A structure according to claim 1, wherein a first diameter of said cover member at an end mounted to said casing is larger than a second diameter of said cover member at another end closest to said power transmitting member.

6. A structure according to claim 1, wherein said cover member includes a flange corresponding to said flange of said casing.

7. A structure according to claim 6, wherein said flanges are connected by at least one fastening member.

8. A structure according to claim 7, wherein said at least one fastening member is a bolt.

* * * * *

UNITED STATES PATENT AND TRADEMARK OFFICE
CERTIFICATE OF CORRECTION

PATENT NO. : 6,761,143 B1
DATED : July 13, 2004
INVENTOR(S) : Itoh et al.

It is certified that error appears in the above-identified patent and that said Letters Patent is hereby corrected as shown below:

<u>Title page, Item [54] and Column 1, lines 1-3,</u>
Please change the title to read as follows:

-- STRUCTURE OF CONNECTION BETWEEN OUTPUT SHAFT OF EXPANDER AND TRANSMITTING SHAFT OF DRIVEN MEMBER --

Signed and Sealed this

Seventh Day of September, 2004

JON W. DUDAS
*Director of the United States Patent and Trademark Office*